United States Patent Office 3,221,915
Patented Dec. 7, 1965

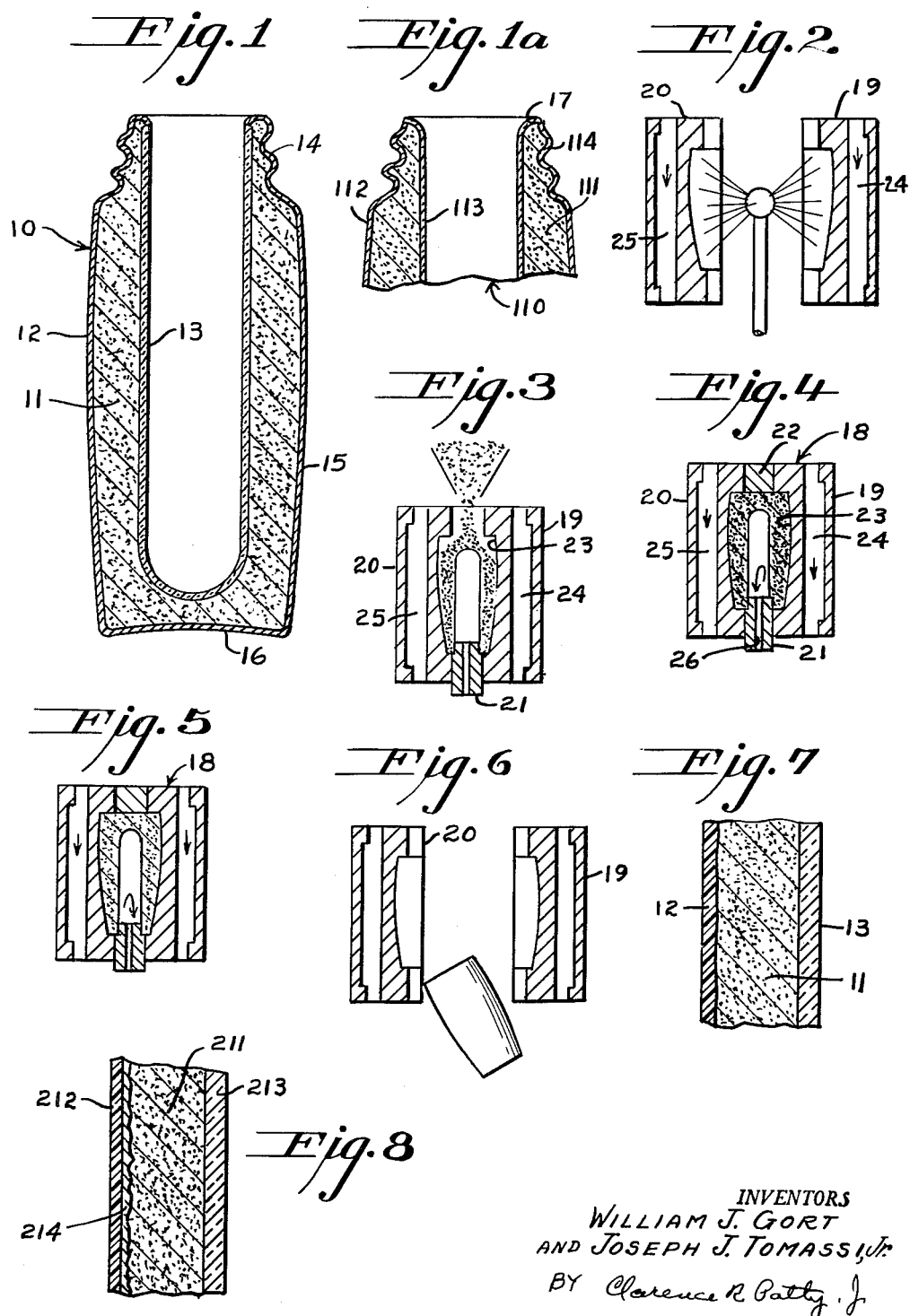

3,221,915
IMPACT-RESISTANT GLASS-LINED
CONTAINERS
William J. Gort and Joseph J. Tomassi, Jr., Corning,
N.Y., assignors to Corning Fibre Box, Corning, N.Y.,
a corporation of New York
Filed Aug. 8, 1962, Ser. No. 215,608
5 Claims. (Cl. 215—13)

This invention relates to light-weight shock resistant containers having unique performance properties and to methods of making same, and more particularly to a container having a glass liner encapsulated within a low density plastic such as an expanded or foamed plastic which is molded into a desired outer configuration and which is completely encased by a dense smooth-surfaced plastic skin.

In the past, it has been common practice to package such items as foods, beverages, internal medications, lotions, and creams, including both cosmetic and therapeutic compositions, in glass containers. Of the known packaging materials available, glass possessed the necessary characteristics of dimensional stability, vapor barrier, and resistance to chemical attack. However, with the advent of plastics, various manufacturers requested members of the packaging industry to develop a light-weight, low-cost, attractively designed container having more sales appeal than ordinary glass. Although extremely lightweight containers having high aesthetic appeal could be inexpensively manufactured from foamed plastic, it became apparent that plastics as a class, or by themselves, could not be utilized to package a vast number of the products produced by the food, beverage, cosmetic, and drug industries. Many of such products contain a volatile ocmponent, either as a main constituent thereof, or as a vehicle or carrier for other ingredients, and accordingly, since plastics are inherently permeable the volatile complement would soon escape through the plastic container, thus rendering the packaged product virtually useless. In addition, other products produced by such industires contain various chemical agents which may not only corrosively attack such plastic containers, but which may actually be solvents for the plastics utilized in their manufacture.

Realizing that glass, or the properties obtainable by glass, had to be utilized or incorporated in packaging such products in order to obtain the necessary zero porosity and resistance to chemical attack, the packaging industry resorted to the old heavy-bodied or standard-wall-thickness glass containers. In an endeavor to achieve the benefits of improved shock resistance and aesthetic outer contour appeal obtainable by utilizing plastic, the industry in effect compromised by encasing the standard glass container within a plastic composition. However, due to the thickness of the wall portions of such standard glass containers previously employed in the packaging of such products, there remained a serious problem of weight, attributable to the mass of glass in such standard containers, which compounded shipping costs.

An additional drawback of this comprised package resided in the external appearance. In order to provide a useful degree of shock resistance, while not materially attributing to the weight problem, foamed plastic had to be utilized to encase the glass container, which produced an outer surface having an unattractive cellular or honeycomb appearance. Although it was possible to obtain a variety of outer configurations, the cellular structure of the outer surface appeared to have limitations as to durability, printability, colorability, smoothness, and gloss. Further, due to the soft nature of the foamed material, it had a tendency to fail adjacent the opening of the container, after nominal applications and removals of the closure member.

Our invention combines the advantages of zero porosity, resistance to chemical attack, and positive dimensional stability obtainable with the utilization of glass, together with the advantages of light-weight, flexibility of design and molding, and good shock resistance obtainable with the utilization of plastics. Further, it obviates the disadvantages of frangibleness, massiveness and heaviness coincident with the use of the standard glass container, and vapor transfer or permeability and susceptibility to chemical attack, coincident with the utilization of plastics alone.

Basically, our invention includes the incorporation of a unique smooth, hard gloss protective and decorative film, skin, or coating formed on the outer surface of a foamed plastic jacket or container, having a thin glass lining encapsulated therewithin.

It thus has been an object of our invention to obviate the previously enumerated problems encountered in the production of light-weight shock-resistant containers and provide an improved container having the desirable properties of glass and plastic while eliminating the effect of the undesirable properties of such materials.

An additional object of our invention has been to provide a practical and inexpensive light-weight, shock-resistant container having unique functional or performance qualities and high sales appeal.

A further object of our invention has been to provide an improved expanded plastic container, molded into a desired outer container configuration, having a thin glass liner encapsulated therewithin to thus produce an extremely light-weight shock-resistant container having the advantages of zero porosity and high resistance to chemical attack.

An adidtional object of our invention has been to provide an improved non-breakable container having a shock-absorbing middle layer of foamed plastic material, a thin impermeable inner layer or liner for forming a vapor barrier, and a smooth, hard outer film or skin to beautify and protect the relatively soft cellular structure of the middle layer.

A still further object of our invention has been to provide an improved method of forming a shock-resistant foamed plastic container having a frangible inner liner of zero porosity and a tough, smooth hard outer skin.

A still further object of our invention has been to provide a method of forming hollow plastic articles having a thin inner glass liner and a hard smooth-surfaces outer skin which includes the steps of preheating a partible mold, applying a film-forming composition to the inner surface of the mold, such as by spraying, inserting a glass liner into the mold cavity, filing the remaining void in the mold cavity with a plastic such as an expandable plastic, applying heat to expand or set the plastic in the mold cavity, cooling the mold, and opening the mold and ejecting the thus formed container therefrom.

These and other objects of our invention will be more apparent to those skilled in the art from the following disclosure and accompanying drawings in which:

FIGURE 1 is a side elevational view in section illustrating an improved container embodying our invention;

FIGURE 1a is a fragmental elevational view in section illustrating a further embodiment of a container within the concept of our invention;

FIGURES 2-6 inclusive schematically illustrate, in cross sectional elevational views, various steps employed in a preferred method of forming the container shown in FIGURE 1;

FIGURE 2 illustrates the preheating and application of the film-forming spray to the open partible mold;

FIGURE 3 illustrates the insertion of a glass liner positioned on a probe within the mold cavity, the closing of the partible mold, and the filling of the mold cavity with expandable beads;

FIGURE 4 illustrates the expanding and fusing of the expandable beads within the mold cavity by applying steam to both the mold and probe;

FIGURE 5 illustrates the cooling of the mold and container by applying cooling fluid such as water to the mold and the probe;

FIGURE 6 illustrates the opening of the partible mold and ejection of the container formed therewithin;

FIGURE 7 is an enlarged fragmental cross section of a wall portion of a preferred embodiment of our container; and FIGURE 8 is an enlarged fragmental cross section of a modified construction of a container embodying our invention.

Referring now to the drawings and particularly FIGURES 1 and 7, a container 10 is shown comprising a main body portion or middle layer 11, an outer skin, film or coating 12 of relatively tough smooth plastic, and a relatively thin inner liner or vapor barrier 13 of glass. Threaded portions 14 may be formed in the main body portion 11 for applying a closure (not shown) thereto. As shown in FIGURE 1, the glass liner may be completely encapsulated by the main body portion or middle layer 11 of foamed plastic so that the entire outer surface of the liner 13, including the upper edge, is surrounded by the shock resistant foamed plastic. The outer layer or skin 12 of tough plastic completely encases the main body portion 11, and terminates adjacent the upper edge of the glass liner 13. The skin 12 not only protects the upper surface portions of the body 11 which may overlie the top edge of the latter 13, but also the threaded portions 14, sidewall portions 15, and heel or bottom portions 16. The thickness of the skin (greatly exaggerated in the drawings for purposes of clarity) can easily be varied, and where areas of great strength are required, such as the threaded portions 14, greater thicknesses may be applied.

FIGURE 1a illustrates a modified form of the invention wherein a glass liner 113, encapsulated within a foamed body portion 111 having an outer skin or film 112 formed thereon, is provided with a lip or pouring flange 17. Pouring lip 17 extends outwardly along the top of the body portion 111 and above threaded portions 114, so that fluid which might attack the foamed plastic body portion or middle layer 111 may be safely retained within and dispensed from the container 116, without effecting or contacting the plastic portions thereof.

FIGURES 2-6 inclusive disclose a method of forming a container similar to that shown in FIGURE 1. The threaded portions, however, have been omitted for the sake of clarity, it being understood that snap-on or friction fit caps or closures may be substituted for a screw-on closure member. As shown, a partible mold 18 having a right mold section 19, a left mold section 20, a bottom probe section 21 and a top plug section 22 form a mold cavity 23. Mold parts 19 and 20 are provided with fluid passages 24 and 25 respectively, and probe 21 has a plurality of fluid passages, one of which is shown at 26.

In operation, the mold parts are first preheated to a temperature of between about 200° F. and 350° F., such as by passing steam through fluid passageways 24 and 25 as shown by the arrows in FIG. 2. We have found that by utilizing such steam at a pressure of between about 60 and 100 p.s.i.g., the mold will be brought to its predetermined temperature within a period of about 5 to 15 seconds. As the pressure or temperature of the steam utilized is increased, the time cycle decreases. A latex coating, either in solution or dispersion form, is then applied to the heated walls of the cavity by any suitable means such as brushing, or spraying as shown in FIGURE 2. The coating material is flash dried on the mold face to form a tacky film of between about 4 and 25 mils in thickness, depending upon the controlled amount applied; however, greater thicknesses may be applied to localized areas where increased strength is required, such as threaded portions.

Although various latex-like coating composition including acrylic, polyvinyl chloride, and polyvinyl acetate may be applied to the mold face to provide a dense encapsulating skin on the main foamed body portion of the container, we have found that polystyrene emulsions produce excellent results, particularly when the main body portion of the container is formed of foamed polystyrene. Polystyrene emulsions such as polystyrene "M" emulsion and polystyrene "R" emulsion, produced by the Koppers Company, which are polymer dispersions containing from about 35% to about 60% of polymer solids in the form of polystyrene spheres dispersed in about 40% to 45% of a liquid carrier medium such as water, have been employed in coating compositions with excellent results. Such emulsions may also contain between 1 to 2% dispersing agents and/or wetting agents. A suitable plasticizer, such as a phthalate plasticizer, is combined with a polystyrene emulsion in producing the coating composition. In addition, titanium dioxide or other pigment is included in the coating formulation to provide good hiding qualities, and various coloring pigments may be added to produce a desired coloration. A preferred coating composition for producing a hard high-gloss skin upon the outer surface of the foamed plastic container body, which is resistant to dents, chipping, and abrasions, is given below in parts by weight of solids:

Polystyrene emulsion (containing 40–45% solids; 1–2% wetting and/or dispersing agents; and 53–59% water) _____parts__ 100
Di-ethylhexyl phthalate plasticizer_____do____ 25–30
Titanium dioxide _____do____ 5–15
Colored pigment _____do____ 5–10

After coating the mold, a thin glass liner or vapor barrier is positioned on the bottom probe section 21, as shown in FIGURE 3. The glass liner is formed with a wall thickness of between about 10 mils and about 50 mils to provide a nonporous inner structure of minimum weight. The liner is sized and shaped so as to contain the proper quantity of product to be packaged, and assist its positionment within the final container. Further, it may also be shaped to assist the application of the closure and be provided with lid portions, threaded configurations, grooved portions, etc.

The preheated mold having the latex film formed on the inner mold cavity is then brought to its closed position, except for the top filling plug section 22, and the mold cavity 23 filled with expandable plastic beads as shown in FIG. 3. With the mold preheated to a temperature of between about 200° F. and 350° F., the carrier for the film is rapidly vaporized, whereas a prolonged period would otherwise be required if the mold temperature were below 200° F. The expandable beads would have a tendency to melt and flow, if exposed to a temperature above 350° F. for any extended period of time, however, the plastic skin, being a poor heat conductor, has a tendency to insulate the beads from the direct heat of the mold. Although expandable or foamed phenolic, epoxy, and polyurethane plastics may be utilized for filling the mold cavity and forming the body portion of the container, we prefer to use partially pre-expanded polystyrene beads, such as Koppers' F–40–C Dylite expandable polystyrene beads. The beads are preferably pre-expanded to a bulk density of approximately 6 pounds per cubic foot, although other densities have been employed.

As shown in FIGURE 4, the mold cavity is completely closed off and steam is passed through the fluid passageways of the mold parts including the probe section 21, as indicated by the arrows. Stream supplied to the probe section enters the glass liner, and is then exhausted through an outlet passage (not shown) in the probe section, without entering the mold cavity. The expandable beads upon being heated by the stream passing through the mold jacket and the glass liner expand, fuse together, and not only adhere to the liner but also the plastic skin or film previously supplied to the walls of the mold cavity.

The mold and container, as shown in FIG. 5, are then cooled to a temperature of below 160° by passing cooling fluid such as water through the passages 24 and 25 in the mold jacket and passage 26 in the probe section. The partible mold is then opened and the finished container ejected therefrom as shown in FIGURE 6. The foamed or main body portion of the finished container when formed of expanded polystyrene may have a density ranging from about 4 pounds per cubic foot to about 7 pounds per cubic foot. The film, which is flash formed on the inside of the mold cavity, fuses to the outer surface of the foamed plastic body portion and shrinks sufficiently to release from the mold surface and becomes an integral part of the container to provide a smooth, even, glossy, tough film or outer skin which completely hides the beady or cellular appearance of the foamed body portion.

We have found, as an alternative method, that it is possible to mold or expand the expandable beads by applying heat only to the interior section of the mold through the mold glass liner, but cooling both the interior and exterior of the mold. Further, it is possible to form the foamed body portion either by utilizing foaming-in-place resins, or by supplying an expendable or high-loss-factor constituent such as water with the polystyrene beads and utilizing high frequency induction to expand the beads by heating and converting the water film about the beads to steam. A further alternative method of forming the container is to expand the beads within the mold cavity without the glass liner inserted therewithin, and then inserting a preheated liner into the foamed cavity wherein the foam then postexpands and grips the glass liner.

FIGURE 8 illustrates a further embodiment of the invention wherein the glass liner 213 is protected by an outer coating composition 212 which is applied to the main foamed body portion 211 by means of an adhhesive coating or layer 214. Such an adhesive layer may be necessary in some instances where a particular composition for a desired outer skin is not sufficiently adhesive to or shrinkable about the main foamed body portion.

Although we have disclosed preferred embodiments of our invention, various changes and modifications may be made thereto by those skilled in the art without departing from the spirit and scope of the invention as defined in the following claims:

We claim:
1. An improved shock-resistant container for packaging products having a volatile constituent and for products generally considered incompatible with plastics which comprises, an open ended tubular thin glass liner having an interior surface and an exterior surface with a maximum wall thickness therebetween of about 50 mils forming a vapor barrier between the interior of said container and the exterior thereof, a foamed plastic body portion entirely surrounding said exterior surface of said glass liner, and a smooth tough plastic film formed on the surface of said foamed body portion.

2. An improved shock-resistant light-weight plastic container having a thin vapor barrier inner liner which comprises, a foamed plastic body portion having a minimum density of about four pounds per cubic foot, an open ended tubular glass liner having a maximum wall thickness of about 50 mils positioned within and encapsulated by said foamed body portion to form the vapor barrier between inner and outer wall portions of said container, threaded portions formed in an outer surface of said foamed body portion adjacent an upper end thereof, a smooth tough plastic skin overlying and formed integral with outer surfaces of said foamed body portion, and said plastic skin being thicker about said threaded portions than on the remainder of said foamed plastic body.

3. A container as defined in claim 2 wherein said outer skin is formed of a plastic selected from the group consisting of acrylic, polyvinyl chloride, polyvinyl acetate and polystyrene, and has a maximum thickness excluding the threaded portion of about 25 mils.

4. An improved light-weight shock-resistant plastic container having a thin inner liner providing a vapor barrier which comprises, a cellular plastic body portion selected from the group consisting of polystyrene foam and polyurethane foam having a density greater than 4 pounds per cubic foot, an open ended tubular glass liner having an interior surface and an exterior surface with a maximum wall thickness therebetween of about 50 mils positioned within and encapsulated about its entire exterior surface by said cellular body portion to form the vapor barrier between inner and outer wall portions of said container, a smooth tough plastic skin overlying and formed integrally with outer surface portions of said cellular body portion, and said plastic skin having a substantially uniform thickness of less than 25 mils.

5. An improved container as defined in claim 4 wherein threaded portions are formed in an outer surface of said cellular body portion adjacent an upper end thereof, and said outer plastic skin is thicker about said threaded portions than on the remainder of said cellular plastic body.

References Cited by the Examiner
UNITED STATES PATENTS

| | | | |
|---|---|---|---|
| 2,954,589 | 10/1960 | Brown | 18—59 |
| 2,958,907 | 11/1960 | Mumford et al. | 18—59 |
| 2,963,188 | 12/1960 | Palermo | 215—13 |
| 3,037,652 | 5/1962 | Wallace | 215—13 |

FRANKLIN T. GARRETT, *Primary Examiner.*
EARLE J. DRUMMOND, THERON E. CONDON,
*Examiners.*